June 23, 1942.   H. C. NYE   2,287,559

POWER TRANSMISSION

Filed Dec. 17, 1938

INVENTOR
HUGH C. NYE
BY
Ralph L. Tweedale
ATTORNEY

Patented June 23, 1942

2,287,559

UNITED STATES PATENT OFFICE 2,287,559

POWER TRANSMISSION

Hugh C. Nye, Detroit, Mich., assignor to Vickers Incorporated, Detroit, Mich., a corporation of Michigan Application December 17, 1938, Serial No. 246,251

7 Claims. (Cl. 51—34)

This invention relates to power transmissions, particularly to those of the type comprising two or more fluid pressure energy translating devices one of which may function as a pump and another as a fluid motor.

The invention is particularly adapted for use with a honing machine of known construction wherein one or more radially expending hones is carried by a rotating spindle and is advanced into a previously machined cylindrical bore, the hone being then expanded and the spindle being given a reciprocating motion longitudinally of the bore to impart a preliminary or final finish to the bore. In honing machines as previously constructed considerable difficulty has been experienced in obtaining proper control of the radial expansion of the hone after the latter is inserted in the bore. If breakage of stones is to be avoided it is necessary that the expanding pressure applied to the hone be under precise control and be applied gradually after the hone is positioned in the bore.

It is an object of the present invention to provide an improved hydraulic power transmission system particularly adapted for operating a honing machine wherein means are provided for applying a precisely controlled expanding pressure to the hone.

It is a further object to provide a machine of this character wherein the reciprocating and rotary movements of the head and the expanding and contracting movements of the hone may be made to take place automatically in a predetermined cycle upon manual initiation.

Further objects and advantages of the present invention will be apparent from the following description, reference being had to the accompanying drawing wherein a preferred form of the present invention is clearly shown.

Figure 1:
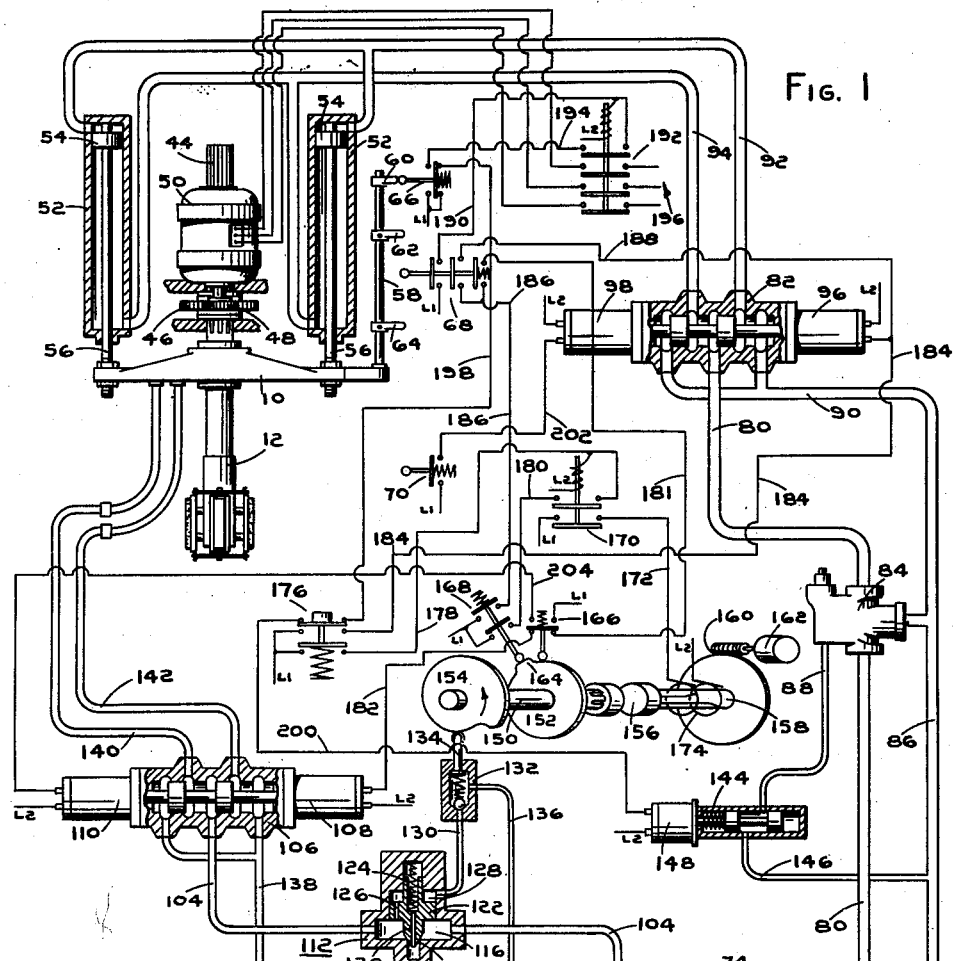
Figure 1 is a diagrammatic view of a power transmission system embodying a preferred form of the present invention.
Figure 2:
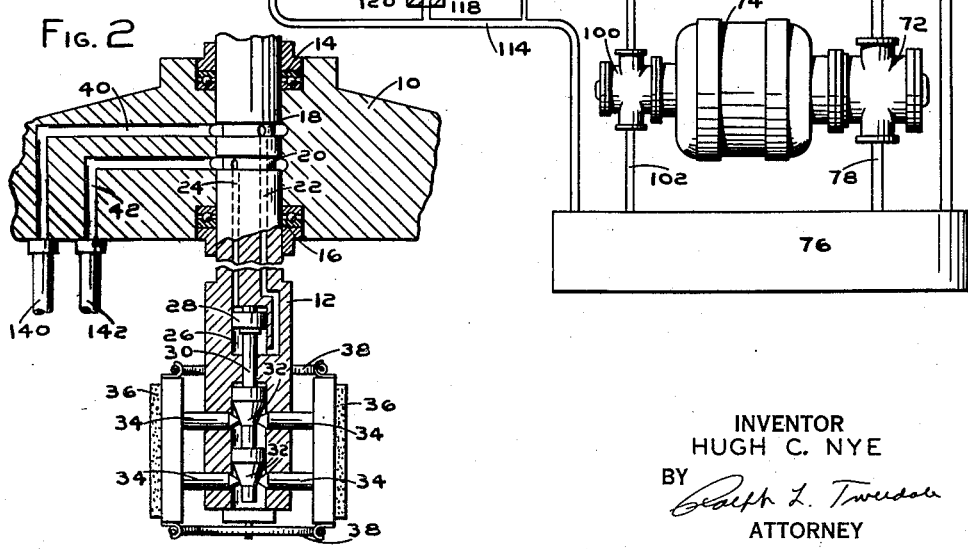
Figure 2 is a fragmentary cross section of the head and spindle of a honing machine.

In the drawing only such portions of the honing machine as are necessary to an understanding of the invention have been illustrated.

Briefly, the honing machine includes a reciprocable head 10 which has rotatably secured thereto a spindle 12 mounted on anti-friction bearings 14 and 16. The spindle 12 is provided with a pair of circumferential grooves 18 and 20 which communicate by internal bores 22 and 24 with the opposite ends of a hone expanding cylinder 26. The latter has a piston 28 with a rod 30 to which is secured a pair of conical sections 32 adapted to engage radial pins 34 slidably mounted in the spindle 12. The pins 34 carry honing stones 36 which are urged to contract by a pair of annular springs 38. The grooves 18 and 20 register with passages 40 and 42 formed in the body of the head 10.

The upper portion of the spindle 12 is provided with a splined portion 44 slidably received in a gear 46 which meshes with a pinion 48 mounted on the shaft of an electric motor 50. The gear 46 is suitably mounted in the frame of the honing machine to prevent translatory movement thereof while permitting rotation.

For reciprocating the head 10 and spindle 12 a pair of hydraulic cylinders 52 are mounted on the frame and have slidably mounted therein pistons 54 connected to the head 10 by rods 56. The head 10 also carries an upstanding dog rod 58 having trip dogs 60, 62 and 64 adapted to control limit switches 66, 68 and 70 respectively.

Fluid for operating the pistons 54 may be supplied from a pump 72 driven by an electric motor 74 and delivering oil from a tank 76 through a suction conduit 78 and delivery conduit 80 to the pressure port of a solenoid-operated closed-center four-way valve 82. A combined relief and unloading valve 84 is mounted in the conduit 80 for bypassing oil to the tank through a conduit 86 when either a predetermined safe pressure is exceeded in the conduit 80 or when the control chamber of the relief valve is vented through a vent conduit 88. The valve 94 may, for example, be constructed similarly to that disclosed in the patent to Harry F. Vickers 2,043,453.

The tank ports of the four-way valve 82 are connected to tank by a conduit 90 while the cylinder ports connect to the opposite ends of the cylinders 52 by conduits 92 and 94. The spool of valve 82 is adapted to be shifted to the right from the position shown by means of a solenoid 96. It is shifted to the left by means of a solenoid 98. Suitable detent mechanism, not shown, may be provided for releasably retaining the valve in either of its two positions.

For the purpose of operating the hone expanding piston 28, a second pump 100 may be driven by the electric motor 74 to deliver fluid from the tank 76 through a suction conduit 102 and delivery conduit 104 to the pressure port of a solenoid-operated four-way valve 106. The latter may be constructed similarly to the valve 82 and provided with solenoids 108 for shifting the spool to the right and 110 for shifting the spool to the left. A relief valve 112 is provided in the conduit 104 for bypassing selectively variable quantities of fluid to the tank through a conduit 114. Valve 112 has a pressure chamber 116 through which the conduit 104 extends and which has a seat 118 opening to the conduit 114. The seat 118 is adapted to be controlled by a valve 120 having a piston 122 and a pilot stem 124 of substantially the same area as the seat 118. A restricted passage 126 extends between the opposite sides of the piston 122. The chamber 128 above the piston 122 communicates by a conduit 130 with a pilot relief valve 132, the spring setting of which may be adjusted by up and down movement of the stem 134. A conduit 136 connects the discharge side of the valve 132 to tank. The tank ports of the valve 106 connect to tank through a conduit 138 while the cylinder ports connect to the passages 40 and 42 by conduits 140 and 142.

For controlling the venting of relief valve 84, a spring-offset solenoid-operated valve 144 is provided for connecting the conduit 88 with the tank through a conduit 146 whenever the solenoid 148 is energized. When the solenoid is deenergized, this communication is blocked.

For the purpose of controlling the energization of the solenoid valves 82 and 106 and for controlling the adjusting stem 134 of the valve 132, an electric circuit is provided as follows:

An electric timer consisting of a shaft 150 carrying cams 152 and 154 is provided. Rotation of the shaft 150 is controlled by an electromagnetic clutch indicated at 156 for selectively connecting the shaft 150 to a shaft 158 driven by worm gearing 160 from a constantly rotating electric motor 162. The cam 154 is cut with a predetermined outline so as to control the position of the adjusting stem 134 and vary the same in a predetermined manner during one revolution of the cam 154.

The cam 152 is provided with a projecting portion 164 adapted to close a switch 166 near the end of one revolution from the position shown and to open a double-pole switch 168 in the position shown.

The energization of the clutch 156 is controlled by a holding relay 170 which, when energized, establishes a circuit from line $L^1$ through a conductor 172 and slip rings 174 to the clutch 156 and line $L^2$. The operating coil of relay 170 has an initiating circuit adapted to be closed when a starting switch 176 is depressed to establish the circuit from line $L^1$ through conductor 178 to the coil of relay 170. When the relay 170 lifts, it establishes its holding circuit through a conductor 180 extending to the bottom contacts of the limit switch 168 and line $L^1$. The starting switch 176 when depressed also establishes a circuit from line $L^1$ through conductor 184 to the solenoid 96.

The limit switch 68, when depressed by the dog 62, establishes two circuits from the line $L^1$ through the upper contacts of switch 168 if the latter are closed, and conductor 186, one being through a conductor 181, switch 166, and a conductor 182 to the solenoid 108, and the other being through a conductor 188 to the solenoid 96. The left-hand contacts of switch 68 establish a circuit from line $L^1$ through a conductor 190 to the operating coil of a holding relay 192. The latter has a holding circuit through a conductor 194 and the left-hand normally closed contacts of switch 66 to line $L^1$. The relay 192 controls the lines 196 which feed the motor 50. The normally open right-hand contacts of switch 66 are adapted to establish a circuit from line $L^1$ through a conductor 198 to the normally closed upper contacts of the starting switch 176 and through a conductor 200 to the solenoid 148 and line $L^2$.

The limit switch 70 is adapted to establish a circuit when depressed from line $L^1$ through a conductor 202 to the solenoid 98. The switch 166 when operated by the cam 152 is adapted to establish a circuit from the line $L^1$ through a conductor 204 to the solenoid 110.

In operation, with the parts in the position illustrated and the motor 74 running, the motor 50 is deenergized. The clutch 156 is deenergized so that the cam shaft 150 is stationary, and the solenoid 148 is energized due to closure of the back contacts of switches 66 and 176, this circuit extending through the conductors 198 and 200. Under these conditions, fluid delivered by the pump 72 to the conduit 80 is bypassed through the valve 84 and conduit 86 to the tank, thus unloading the pump 72.

Due to the outline of the cam 154, the stem 134 is in its uppermost position, thus adjusting the valve 132 to open at a very low pressure which permits the piston 122 to rise until the pressure in chamber 116 falls to a value equal to the pressure determined by the valve 132 plus an increment sufficient to balance the spring bias on the piston 122. The pump 100 is thus unloaded at a comparatively low pressure.

To start the machine in operation the starting switch 176 is depressed manually. This first deenergizes the solenoid 148 permitting the valve 144 to close under its spring bias and block the vent conduit 88 for the valve 84. The latter accordingly closes permitting pressure to build up in line 80, which pressure is transmitted to the valve 82.

The operation of the switch 176 also energized the solenoid 96 through line 184, shifting the spool of valve 82 to the right connecting the pressure conduit 80 to the conduit 92 causing fluid to be delivered to the head end of cylinders 52 and thus initiating descent of the pistons 54 and head 10.

Depression of the switch 176 also initially energizes the holding relay 170 which establishes the circuit 172 to the magnetic clutch 156 which causes the shaft 150 to start turning. After the latter has turned a small amount in the direction of the arrow, the projection 164 permits the switch 168 to close establishing the holding circuit 180 for relay 170. The starting button 176 may now be released. Since the head is concurrently descending the dog 60 has by this time passed off from switch 66 thus breaking the circuit 198 so that solenoid 148 will not be again energized by release of the starting switch.

As the head 10 descends the trip dog 62 contacts the limit switch 68 closing the same to establish the initiating circuit 190 for the holding relay 192. The latter lifts energizing the motor 50 and establishing its own holding circuit 194 since the limit switch 66 is now in its normal position. The spindle 12 is thus started to rotate.

Closure of limit switch 68 also establishes a circuit from line $L^1$ through the switch 168 which is now closed, conductor 186 and conductor 188 to the solenoid 96. Since this solenoid was previously energized by depression of the starting switch 176, the spool of valve 82 does not move.

The limit switch 68 establishes a third circuit from conductor 186 through conductor 181, switch 166 which is now in its normally down position, and conductor 182 to the solenoid 108. This shifts the spool of valve 106 to the right, thus admitting pressure oil from the delivery conduit 104 through conduits 142, 42 and 24 to the head end of the hone-expanding cylinder 26. The piston 28 accordingly moves downwardly projecting the stones 36 outwardly into engagement with the walls of the bore to be honed. The pressure of such engagement, however, is limited to a rather low value due to the periphery of the cam 154 which at this point in the rotation thereof has not depressed the stem 134 but slightly.

As the head 10 continues to descend the dog 64 strikes the switch 70 establishing the circuit 202 to the solenoid 98 which accordingly shifts the spool of valve 82 to the left directing pressure oil to the conduit 94 and the lower end of cylinders 52.

The head 10 accordingly reverses and starts upwardly. As this upward motion is continued, the dog 62 approaches the limit switch 68 from the bottom and again closes the same to at this time again energize the solenoid 96 shifting the valve 82 to the right and thus reversing the travel of the head 10.

Switch 68 also energizes the holding relay 192 but the latter is continuously energized anyway by its holding circuit. Likewise switch 68 energizes solenoid 108 through conductors 181 and 182, but since the latter has been previously shifted to the right, no result is produced.

The head accordingly continues its reciprocating motion between the limits established by the position of the dogs 62 and 64, until the cam shaft 150 has nearly completed a revolution. During this rotation the cam 154 has gradually depressed the stem 134 to increase the expanding pressure exerted on the stones 36. If desired, the cam 154 may be shaped so as to also gradually decrease this pressure after it has built up to a maximum and been maintained at that value for a greater portion of the honing period. As will be obvious the outline of cam 154 may be made in any form desired and by experience and trial can be so shaped as to produce the best possible finish in the time allotted.

When the projection 164 comes around to lift the switch 166, the circuit for solenoid 108 is broken and the circuit 204 for solenoid 110 is established. This causes the valve 106 to shift to the left admitting pressure oil to the conduit 140 and the lower side of the cylinder 26 to retract the piston 28 and the stones 36. Shortly thereafter the projection 164 strikes the switch 168 opening the same which opens the holding circuit for relay 170 thus deenergizing the circuit 172 for the clutch 156.

Switch 168 also breaks the circuit 186 so that the dog 62 when it next moves upwardly past the switch 68 will not energize the solenoid 96 nor the solenoid 108. As the head thus continues upwardly, when it reaches its upper position the dog 60 strikes the limit switch 66, thus opening the holding circuit 194 for relay 192 and deenergizing the motor 50.

Switch 66 also establishes the circuit 198—200 for solenoid 148 thus shifting the valve 144 to vent relief valve 84 and unload the pump 72. The parts are then in the position from which they started.

While the form of embodiment of the invention as herein disclosed constitutes a preferred form, it is to be understood that other forms might adopted, all coming within the scope of the claims which follow.

What is claimed is as follows:

1. In a hydraulic power transmission for operating a honing machine the combination with a translatable head and an expansible hone carried thereby, of power means for effecting advancing and retracting movement of the head, a fluid motor for effecting expansion and contraction of the hone, a pump for supplying pressure fluid to operate the motor, adjustable pressure responsive means for controlling the rate of fluid delivery to the motor and thereby controlling the effective pressure on the fluid motor, power-operated means for adjusting the pressure responsive means to vary the fluid pressure effective in said motor during the honing operation, and means controlled by said power-operated means for controlling the power means for advancing and retracting the head.

2. In a hydraulic power transmission for operating a honing machine the combination with a translatable head and an expansible hone carried thereby, of power means for effecting advancing and retracting movement of the head, a fluid motor for effecting expansion and contraction of the hone, a pump for supplying pressure fluid to operate the motor, adjustable pressure responsive means for controlling the rate of fluid delivery to the motor and thereby controlling the effective pressure on the fluid motor, a cycle timer including cam means for variably adjusting the pressure responsive means, and means controlled by the timer for initiating an advance movement of the head, means controlled by the head for causing alternate reciprocations through a predetermined range and means controlled by the timer for terminating the reciprocation of the head and retracting the same.

3. In a hydraulic power transmission for operating a honing machine the combination with a translatable head and an expansible hone carried thereby, of power means for effecting advancing and retracting movement of the head, a fluid motor for effecting expansion and contraction of the hone, a pump for supplying pressure fluid to operate the motor, adjustable pressure responsive means for controlling the rate of fluid delivery to the motor and thereby controlling the effective pressure on the fluid motor, a cycle timer including cam means for variably adjusting the pressure responsive means, and means controlled by the timer for initiating an advance movement of the head, means controlled by the head for causing alternate reciprocations through a predetermined range, means controlled by the timer for terminating the reciprocation of the head and retracting the same, and means controlled by the timer to initiate contraction of the head prior to retraction of the head.

4. In a hydraulic power transmission for operating a honing machine the combination with a translatable head and an expansible hone carried thereby, of a fluid motor for effecting expansion and contraction of the hone, a pump for supplying pressure fluid to operate the motor, and means for regulating the fluid pressure effective on said motor to thereby control the expansive force exerted by the hone, said means including a valve for bypassing a portion of the fluid delivered by the pump, a piston for operating the valve and having one side freely communicating with the delivery side of the pump and its other side in restricted communication therewith, and a spring-loaded, pressure-responsive, pilot relief valve for controlling the exhaust of fluid from said other side of the piston.

5. In a hydraulic power transmission for operating a honing machine the combination with a translatable head and an expansible hone carried thereby, of a fluid motor for effecting expansion and contraction of the hone, a pump for supplying pressure fluid to operate the motor, and means for regulating the fluid pressure effective on said motor to thereby control the expansive force exerted by the hone, said means including a member shiftable to control the quantity of fluid delivered to the motor, a piston for operating said member and having one side freely communicating with the delivery side of the pump and its other side in restricted communication therewith, and a spring-loaded, pressure-responsive pilot relief valve for controlling the exhaust of fluid from said other side of the piston.

6. In a hydraulic power transmission for operating a honing machine the combination with a translatable head and an expansible hone carried thereby, of power means for effecting advancing and retracting movement of the head, a fluid motor for effecting expansion and contraction of the hone, a pump for supplying pressure fluid to operate the motor, adjustable pressure responsive means for controlling the rate of fluid delivery to the motor and thereby controlling the effective pressure on the fluid motor, power-operated cam means for controlling the adjustment of the last-mentioned means for causing the hone to exert an expanding pressure which varies in a predetermined manner during a honing operation, and a magnetic clutch for controlling operation of said cam means.

7. In a hydraulic power transmission for operating a honing machine the combination with a translatable head and an expansible hone carried thereby, of power means for effecting advancing and retracting movement of the head, a fluid motor for effecting expansion and contraction of the hone, a pump for supplying pressure fluid to operate the motor, adjustable pressure responsive means for controlling the rate of fluid delivery to the motor and thereby controlling the effective pressure on the fluid motor, a cycle timer including cam means for variably adjusting the pressure responsive means, and means controlled by the timer for initiating an advance movement of the head, means controlled by the head for causing alternate reciprocations through a predetermined range, means controlled by the timer for terminating the reciprocation of the head and retracting the same, means for manually initiating operation of the timer, and means controlled by the timer for terminating operation thereof when the reciprocation of the head is terminated.

HUGH C. NYE.